Oct. 30, 1956  G. BIEK  2,768,457
TUBULAR IDENTIFICATION TAG HOLDER
Filed May 21, 1953
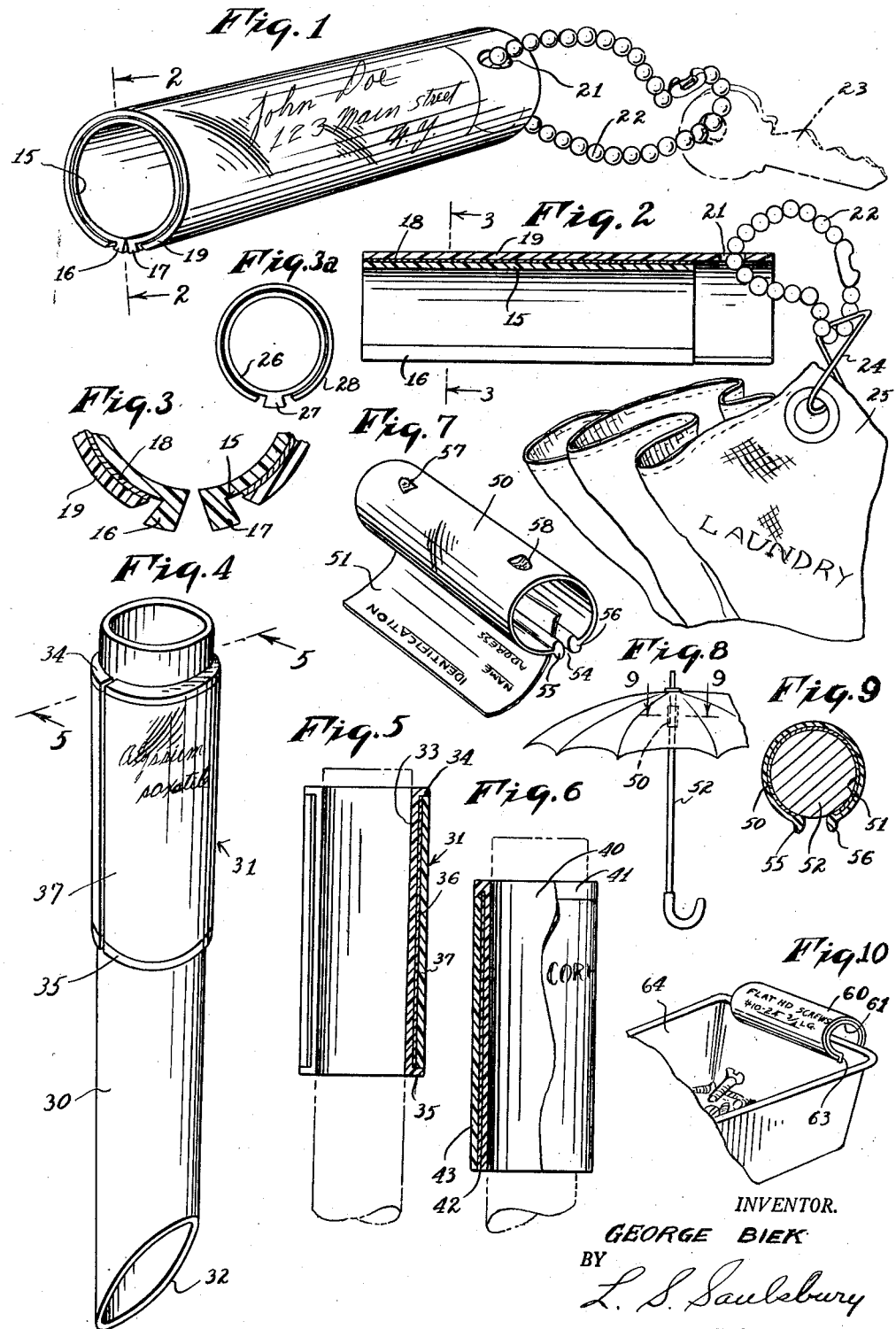
INVENTOR.
GEORGE BIEK
BY
L. S. Saulsbury
ATTORNEY

United States Patent Office 2,768,457
Patented Oct. 30, 1956

2,768,457
TUBULAR IDENTIFICATION TAG HOLDER

George Biek, Astoria, N. Y.

Application May 21, 1953, Serial No. 356,410

2 Claims. (Cl. 40—19)

This invention relates to a tubular identification tag holder.

It is an object of the present invention to provide a tubular identification tag holder wherein the parts can be easily separated for the insertion thereinto of the identification tag and wherein such tag, when the parts are assembled, will be tightly gripped and retained within the holder and in an airtight manner.

It is another object of the invention to provide a tubular identification tag holder adapted to be secured to a tubular member, such as to a garden post or to an umbrella handle rod, or to the supporting edge of a tray.

It is another object of the invention to provide a tubular identification tag holder wherein the parts have projections therein for preventing the rotation of the identification tag within the hollow parts and also the longitudinal displacement of the same therewithin.

Other objects of the invention are to provide a tubular identification tag holder having the above objects in mind which is of simple construction, inexpensive to manufacture, may be made either by molding or by extrusion, has a minimum number of parts, easy to assemble, compact, light in weight, of pleasing appearance, efficient and convenient to use.

For other objects and for a better understanding of the invention, reference may be had to the following detailed description taken in connection with the accompanying drawing, in which:

Figure 1 is perspective view of a tubular identification tag holder constructed according to one form of the invention and adapted for the attachment of a key chain thereto and having expandable tubular parts;

Fig. 2 is a longitudinal sectional view taken on line 2—2 of Fig. 1;

Fig. 3 is an enlarged fragmentary sectional view of the holder shown in Figs. 1 and 2 and as viewed on line 3—3 of Fig. 2;

Fig. 3a is an end elevational view of a modified form of the invention wherein the inner tube is of solid cylindrical construction and only the external tube is expandable;

Fig. 4 is a perspective view of a garden marker post, having an identification tag thereon constructed according to a modified form of the invention;

Fig. 5 is a vertical sectional view taken on line 5—5 of Fig. 4;

Fig. 6 is a vertical elevational view of a still further form of the invention, similar to the form of the invention shown in Fig. 5 with a flange at the upper end to render the same waterproof;

Fig. 7 is a perspective view of a still further form of the invention wherein the identification tag is enclosed in a single cylinder, and wherein projections are provided to prevent the slipping of the tag longitudinally against rotation therein;

Fig. 8 is an elevational view of an umbrella illustrating the manner in which the holder shown in Fig. 7 is attached thereto;

Fig. 9 is an enlarged transverse sectional view of the holder of Fig. 7 and as shown on line 9—9 of Fig. 8;

Fig. 10 is a perspective view of a further form of the invention attached the upper edge of a supply bin.

Referring now particularly to Figs. 1, 2 and 3, 15 represents an inner sleeve which is split on one side thereof so that it may be expanded and having respectively longitudinally extending flanged end portions 16 and 17 opposing one another along the slit.

An identification tag 18 is disposed over the split sleeve 15 and is covered and retained by a transparent external or outer split sleeve 19 that will hold the identification tag tightly and smoothly about the inner split sleeve 15. The outer sleeve 19 is longer than the inner sleeve 15 and has a hole 21 through which is extended a key chain 22 adapted to retain a key 23 or to which a wire clip 24 can be used for the attachment of the holder to a laundry bag 25, as illustrated in Fig. 2. Also the inner tube may be longer than the outer sleeve and holes provided in the inner sleeve for the chain. Inner and outer sleeves 15 and 19 may also be same length with chain running through radially aligned holes, which will lock the cylinders thus preventing one sliding over the other lengthwise.

In order to release the identification tag 18, the flange portions 16 and 17 can be drawn together and in this manner the identification tag will be released and without need for spreading the outer sleeve. The flanges 16 and 17 prevent rotation of the identification tag on the inner cylinder 15.

In Fig. 3a, there is shown a slightly modified form of the invention wherein the internal sleeve is a solid one as indicated at 26 and has a longitudinally extending projection 27 serving as a stop to keep the identification tag from rotating thereupon. An outer sleeve 28 is split and will serve to retain the identification tag in tight relationship with the solid internal sleeve 26.

In Figs. 4 and 5 there is shown an identification tag holder which is particularly adapted for use on a garden stick, 30. This holder is shown generally on the upper end of the stick as indicated at 31. The stick is made of hollow metal or plastic sleeve or solid wood and is cut on a diagonal on its lower end as shown at 32. This holder 31 comprises an inner sleeve 33 which is flanged as at its opposite ends as indicated respectively at 34 and 35. This inner sleeve 33 is slit and adapted to be expanded to fit on the marker 30. The flanges 34 and 35 prevent the identification tag 36 from sliding longitudinally of the sleeve 33 and also will provide a cover for the ends of the sleeve to prevent the ingress of water or dirt. Surrounding the identification tag and disposed between the flanges of the inner sleeve is a split outer sleeve 37. This outer sleeve 37 is transparent and the identification tag will be seen therethrough.

In Fig. 6, there is a slightly modified form of the tag holder for use on a marker stock for gardens. An inner sleeve 40 has only one flange 41 at the upper end thereof. Identification tag 42 is disposed over the inner sleeve 40 and is held in place by an outer transparent sleeve 43. These sleeves are split and fit tightly together and the identification tag 42 is disposed between them.

Referring now particularly to Figs. 7, 8, and 9, there is shown a simple form of the invention. A single sleeve 50 is used for the securement of the identification tag 51 on a round shaft, such as an umbrella shaft 52. This sleeve 50 is transparent and is split at 54, and at the split the edges have respectively enlargements 55 and 56 that extend radially inwardly and radially outwardly. The edges on extending inwardly will retain and hold the edges of the identification tag to prevent the same from rotating therewithin. The outer radial extensions of the enlargements 55 and 56 will serve as grips or handles by which the sleeve can be opened or spread in order to affix the sleeve to the umbrella shaft or to remove the same therefrom.

In order to prevent the identification tag 51 from moving longitudinally through the sleeve 50 radial indentations 57 and 58 are made in the sleeve and are longitudinally spaced from each other to engage with the ends of the identification tag so as to prevent it from slipping longitudinally along the shaft and through the sleeve 50.

In Fig. 10, there is shown a tag-holder assembly similar to form shown in Figs. 1 to 3, comprising inner and outer split tubes 60 and 61 of equal length and having an identification tag disposed therebetween. The inner sleeve has flanged end portions 63. These sleeves are spread and extended over the enlarged upper edge of a supply bin 64.

It should now be apparent that there has been provided identification tag holders formed of split sleeves with the tag disposed therebetween where both the inner and outer sleeves are split; and where only the outer sleeve may be split with the inner sleeve solid; and wherein projections are provided on either of the sleeves to prevent the rotation of the identification tag in the space between the sleeves and also where provision is provided to prevent displacement of the identification lengthwise or longitudinally through the sleeve.

While various changes may be made in the detail construction, it shall be understood that such changes shall be within the spirit and scope of the present invention as defined by the appended claims.

What is claimed is:

1. An identification tag holder comprising a split internal sleeve having radially-outwardly extending enlargements running respectively along the respective opposite sides of the split of the sleeve to retain the identification tag against rotational displacement thereupon, and an external transparent longitudinally-split sleeve fitted over the internal sleeve and being split to expand and grip the identification tag that may be disposed between the sleeves, the opposite sides of the split of said external sleeve respectively lying adjacent the respective radially outwardly extending enlargements of the internal sleeve, said enlargements projecting outwardly beyond the outer sleeve from the split thereof and providing finger grips by which to compress the inner sleeve to release or permit the easy removal or insertion of the identification tag from or between the sleeves and to hold the identification tag and the external sleeve against rotational displacement upon the inner sleeve.

2. An identification tag holder as defined in claim 1 and at least one of said sleeves has an opening through one end thereof and a key chain extending through said opening, said key chain serving to prevent the longitudinal displacement of the inner sleeve within the outer sleeve.

References Cited in the file of this patent
UNITED STATES PATENTS

| | | |
|---|---|---|
| 815,054 | Weaver | Mar. 13, 1906 |
| 1,401,454 | Anderson | Dec. 27, 1921 |
| 1,830,102 | Felsenthal | Nov. 3, 1931 |
| 2,159,547 | Bjorkquist | May 23, 1939 |
| 2,264,194 | Wuestman | Nov. 25, 1941 |
| 2,297,285 | Bledsoe | Sept. 29, 1942 |
| 2,690,624 | Phillips | Oct. 5, 1954 |